United States Patent [19]

Sazaki

[11] Patent Number: 4,526,327

[45] Date of Patent: Jul. 2, 1985

[54] FISHING SPINNING REEL

[75] Inventor: Kounin Sazaki, Fuchu, Japan

[73] Assignee: Ryobi Limited, Fuchu, Japan

[21] Appl. No.: 516,944

[22] Filed: Jul. 25, 1983

[30] Foreign Application Priority Data

Aug. 2, 1982 [JP] Japan .......................... 57-119267[U]

[51] Int. Cl.³ ............................................. A01K 89/01
[52] U.S. Cl. ................................................ 242/84.2 G
[58] Field of Search ..................... 242/84.2 G, 84.2 F, 242/84.21 R

[56] References Cited

U.S. PATENT DOCUMENTS

| | | | |
|---|---|---|---|
| 3,550,874 | 12/1970 | Sarah | 242/84.2 G |
| 4,095,756 | 6/1978 | Morishita | 242/84.2 G |
| 4,337,905 | 7/1982 | Sazaki | 242/84.2 G |
| 4,426,045 | 1/1984 | Gifford | 242/84.2 G |

Primary Examiner—Billy S. Taylor
Attorney, Agent, or Firm—Frishauf, Holtz, Goodman & Woodward

[57] ABSTRACT

A spinning reel is provided with a rotor having opposed arms projecting over a skirted portion of a normally non-rotated spool. A line guide bail has arm cams at its ends to pivotally support the bail to the rotor. One of the bail arm cams also forms a lever portion. The bail is pivoted through a wide angle, in response to rotation of the rotor, from a line casting position to an intermediate position and finally to a line winding position. In moving from the casting to the intermediate position, the bail arm lever strikes a kick plate carried by a stationary reel support leg. This conditions the bail so that an interior, stationary kick bose is engaged by a kick plate connected by a link to the bail arm cam to swing the plate and connected bail to line winding position.

3 Claims, 7 Drawing Figures

FISHING SPINNING REEL

BACKGROUND OF THE INVENTION

This invention relates to a fishing spinning reel, and more particularly to a bail arm reversing device suitable for an outer-spool type fishing spinning reel.

In an outer-spool type fishing spinning reel, it is necessary for a bail arm to have larger swinging angle than in an inner-spool type fishing reel in order to avoid contact of a line with a bail arm during its pay-out operation. Such contact may damage or break a line being payed out.

In the prior art bail arm reversing devices, however, reversing movement of a bail arm through the whole swinging angle thereof against the resilient force of a torsion spring biasing the bail arm to its line-casting position is caused by the mere engagement between a kick lever connected to a bail arm lever or a bail arm cam and a kick boss secured to a reel body, so that a larger force is required to initially rotate a handle to automatically reverse a bail arm to its line-rewinding position if the swinging angle of a bail arm is increased. Further, it is sometimes necessary to once rotate a handle in the opposite direction and then rotate it in the direction to reverse a bail arm having momentum, which disturbs quick response to the fight of fish.

SUMMARY OF THE INVENTION

It is therefore an object of the Invention to provide an improved fishing spinning reel capable of reversing a bail arm quickly with a small force while a bail arm has large swinging angle.

According to the invention, there is provided a fishing spinning reel comprising: a bail arm having opposite ends secured to a bail arm lever and a bail arm cam both being rotably shouldered on a pair of opposing arms of a rotor; first means for rotating a bail arm from its line-casting position to its intermediate position upon the rotation of a handle; and second means for successively rotating a bail arm from its intermediate position to its line-rewinding position upon the successive rotation of the handle.

DETAILED DESCRIPTION

Figure 1:
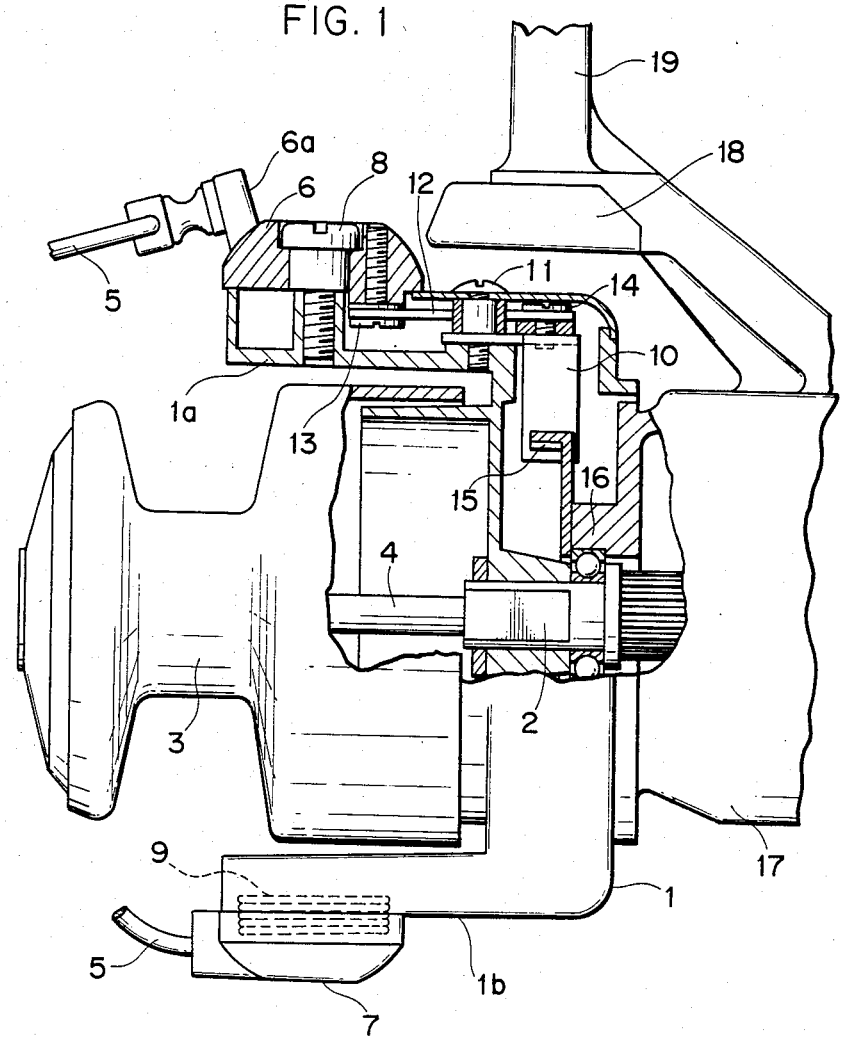
FIG. 1 is a partially-cut side view showing the outer spool type fishing spinning reel embodying the invention.

In a fishing spinning reel shown in FIG. 1, a rotor 1 is rotated by a rotary shaft 2 and a spool 3 is moved reciprocably in forward and rearward directions by a spool shaft 4 upon the rotation of a handle, not shown.

A bail arm 5 is secured at its respective ends to a bail arm lever 6 and a bail arm cam 7, both being rotatably mounted by step screws 8 on a pair of diametrically opposing arms 1a and 1b of the rotor 1. The bail arm 5 is swingable between its line-casting and line-rewinding positions while it is biased to its line-casting position by a torsion spring 9 arranged between the arm 1b and the bail arm cam 7.

Figure 2:
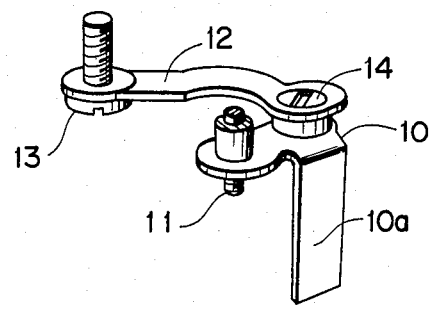
FIG. 2 is a perspective view of a kick lever and a link lever.

A kick lever 10, as shown in FIG. 2, is rotatably pivoted to the inner wall of the arm 1a by a screw 11. The bent plate 10a of the kick lever 10 extends toward the rotary shaft 2. A link lever 12 is arranged inside the arm 1a, one end of which is secured to the bail arm lever 6 by a screw 13 while the other end is secured to the kick lever 10 by a screw 14.

Figure 3:
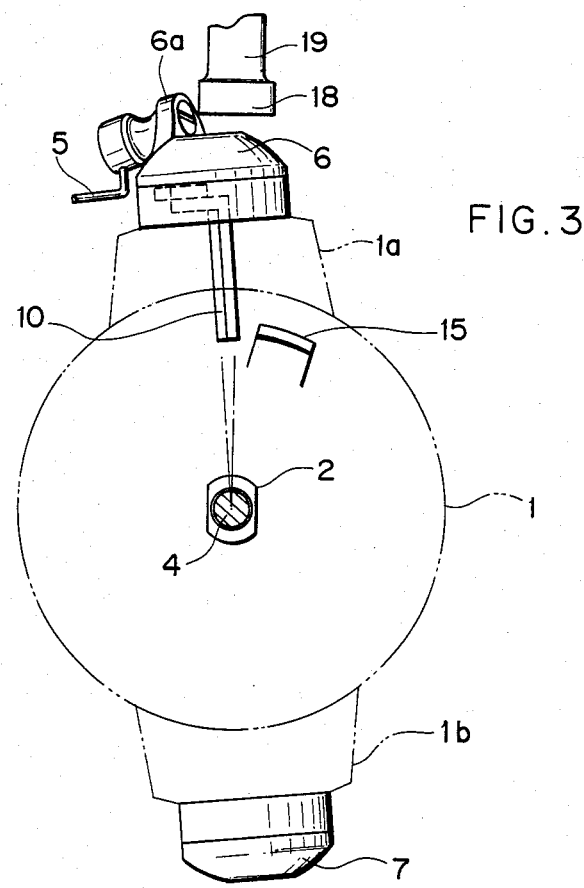
FIG. 3 is a schematic elevational view of the reel shown in FIG. 1.

As seen in FIG. 1, a kick boss 15 is secured to and extends radially from the connecting boss 16 of a reel body 17, so that the front end of the kick boss 15 is able to come into contact with the front end of the bent plate 10a of the kick lever 10 when the rotor 1 is rotated while the bail arm 5 is at its line-casting position as shown in FIGS. 1 and 3.

A kick plate 18 is provided on a rod supporting leg 19 extending from the reel body 17 in such a position that it is able to come into contact with the lever portion 6a of the bail arm lever 6 when the rotor 1 is rotated while the bail arm 5 is at its line-casting position.

Figure 4:
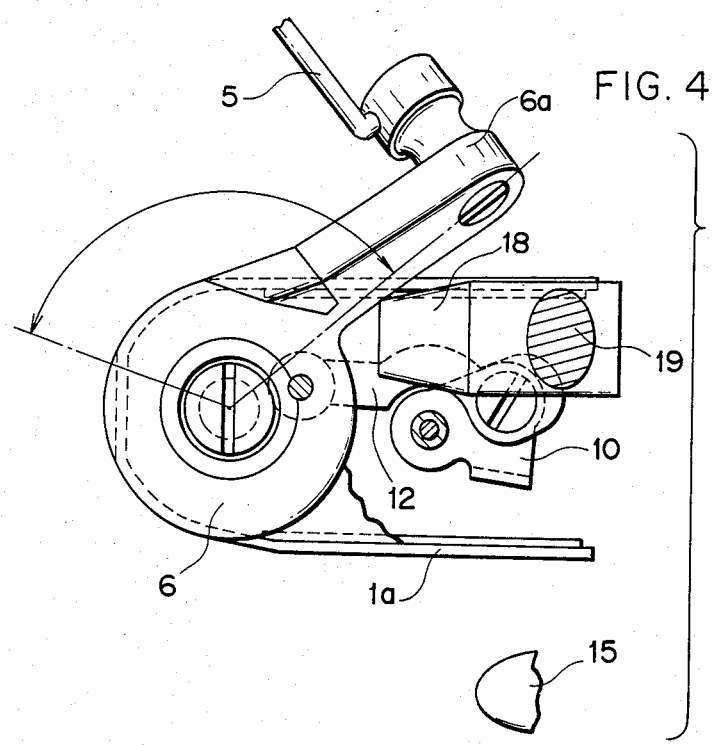
FIGS. 4-7 are explanatory views showing the relationship among a bail arm lever, a kick plate, a kick lever and a kick boss during the rotation of a rotor while a bail arm is at its line-casting position.
Figure 5:
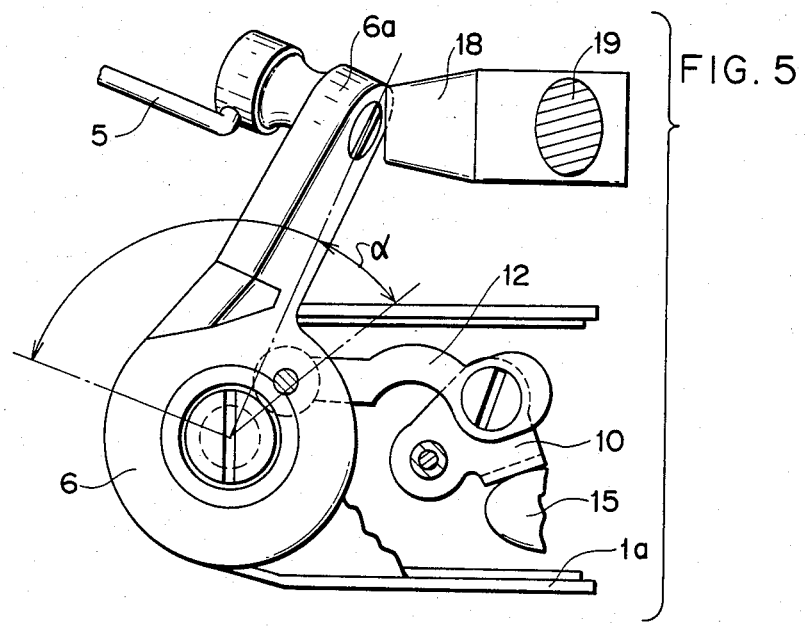
Figure 6:
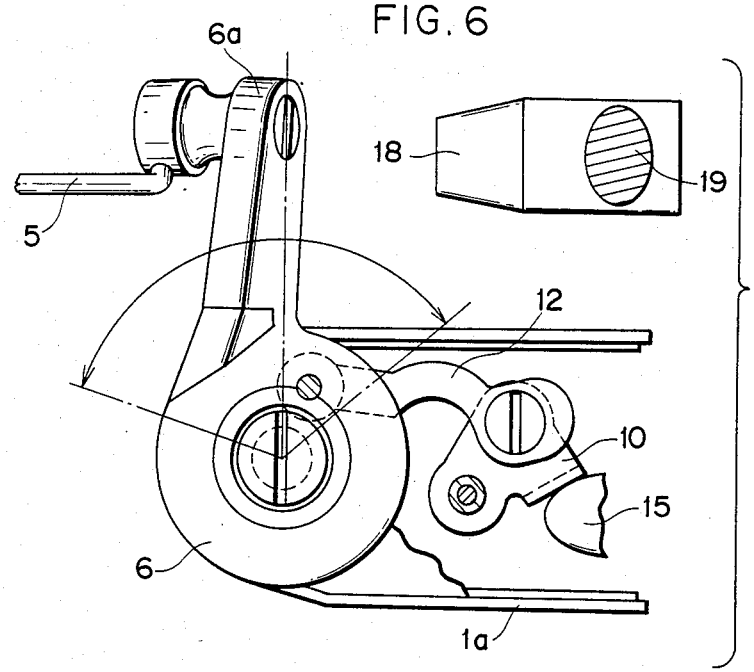
Figure 7:
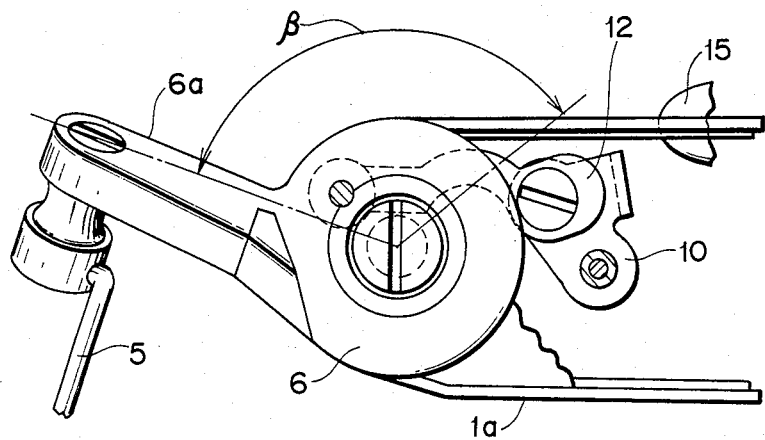

With the above constructed fishing spinning reel, when the rotor 1 is rotated by a handle, not shown, while the bail arm 5 is at its line-casting position as shown in FIG. 1, the lever portion 6a of the bail arm lever 6 comes into contact with the kick plate 18 as illustrated in FIG. 4. At this time, the kick boss 15 does not contact with the kick lever 10. When the arm 1a reaches the position shown in FIG. 5, the bail arm lever 6 has been rotated over an angle $\alpha$ against the resilient force of the torsion spring 9 by the kick plate 18 and simultaneously the kick lever 10 comes into contact with the kick boss 15. Then, the bail arm lever 6 continues to be further rotated by the rotation of the kick lever 10 caused by the contact with the kick boss 15 and transmitted through the link lever 11 as illustrated in FIG. 6. Finally, as shown in FIG. 7, the bail arm lever 6 is rotated over the whole angle $\beta$ and reaches its line-rewinding position and is locked by a stopper, not shown.

As above described, according to this invention, the bail arm is reversed to its line-rewinding position from its line-casting position by two steps, if the swinging angle of the bail arm is increased, the required force to rotate the handle to reverse the bail arm is not so large as that required for the prior art fishing reel where the bail arm is reversed only by one step, i.e. the mere contact of the kick lever and the kick boss against the force of the torsion spring. Thus, it becomes possible to quickly reverse the bail arm with a small force while the swinging angle of the bail arm is sufficient to prevent the contact of the line with the bail arm during a line-casting operation.

What is claimed is:

1. In a fishing spinning reel comprising a rotatable rotor, a bail arm rotatable between a line casting and a line-rewinding position, a bail arm lever coupled to said bail arm, a bail arm cam coupled to said bail arm, and a rotatable handle for rotating said bail arm;

the improvement comprising:
said bail arm having opposite ends respectively secured to said bail arm lever and said bail arm cam;
said rotor having opposing arms on which said bail arm lever and bail arm cam are respectively rotatably mounted;

first means for rotating said bail arm from said line-casting position thereof to an intermediate position thereof upon rotation of said handle; and second means for successively rotating said bail arm from its intermediate position to said line-rewinding position thereof upon successive rotation of said handle;

said first means comprising a kick plate mounted on a supporting member and arranged to contact said bail arm lever when said rotor is rotated while said bail arm is at its line-casting position; and said second means comprising a kick boss secured a reel body; and a kick lever pivotally mounted on one of said opposing arms of said rotor, one end of said kick lever being coupled to one of said bail arm cam and said bail arm lever and the other end of said kick lever being arranged to contact with said kick boss after said bail arm is rotated to its intermediate position.

2. The fishing spinning reel of claim 1, wherein said supporting member which supports said kick plate comprises a rod supporting leg extending from said reel body for supporting said kick plate.

3. The fishing spinning reel of claim 1, wherein said bail arm lever and said bail arm cam both have holes therein, said holes having shoulders thereon, and wherein said bail arm lever and bail arm cam are mounted on respective mounting members which engage said respective shoulders thereof.

* * * * *